United States Patent [19]

Larson

[11] 4,388,269
[45] Jun. 14, 1983

[54] SPACER GRID CORNER GUSSET

[75] Inventor: Jeffrey G. Larson, Lynchburg, Va.

[73] Assignee: The Babcock & Wilcox Company, New Orleans, La.

[21] Appl. No.: 209,087

[22] Filed: Nov. 21, 1980

[51] Int. Cl.$^3$ ............................................. G21C 3/34
[52] U.S. Cl. ................................. 376/442; 376/438; 376/439
[58] Field of Search ...................... 376/438, 439, 442

[56] References Cited

U.S. PATENT DOCUMENTS 3,481,021 12/1969 Glandin .............................. 376/438
3,751,335 8/1973 Keith .................................. 376/442
3,932,216 1/1976 Jabsen ................................ 376/442

Primary Examiner—Donald P. Walsh
Attorney, Agent, or Firm—Robert J. Edwards; D. Anthony Gregory

[57] ABSTRACT

A spacer grid for a nuclear fuel assembly wherein hangup between diagonally adjacent fuel assemblies in the reactor core during loading and unloading is essentially precluded by providing an inclined plane deflection surface at each corner of the spacer grid.

5 Claims, 8 Drawing Figures

U.S. Patent  Jun. 14, 1983  Sheet 1 of 3  4,388,269
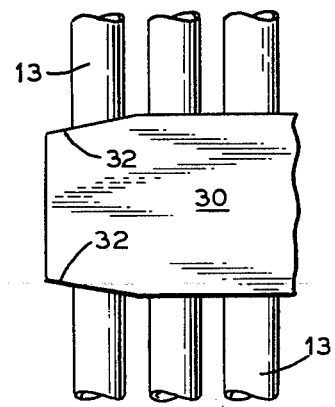
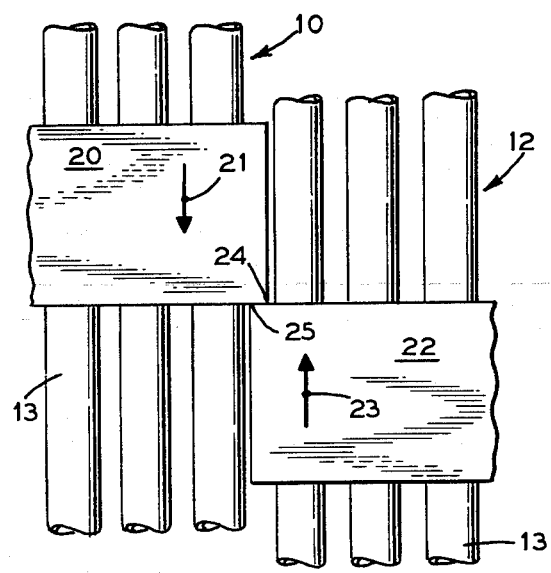
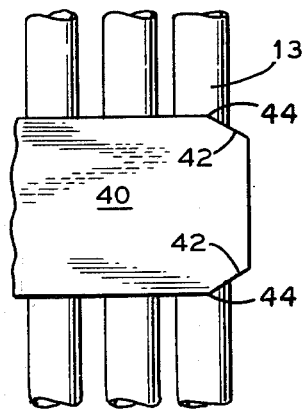
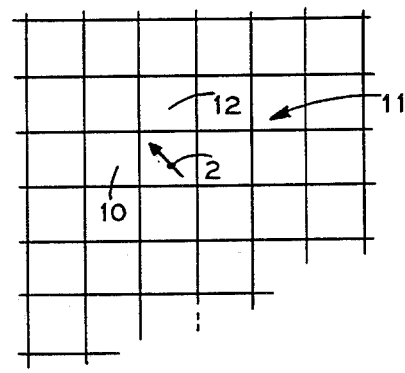

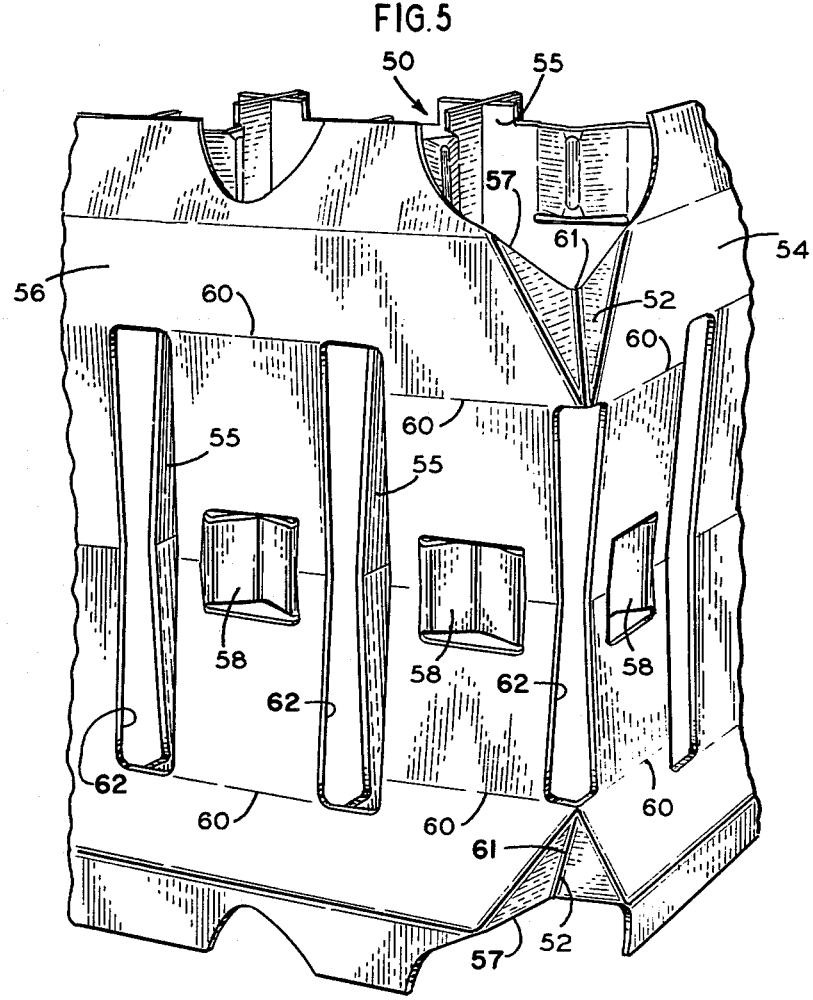

SPACER GRID CORNER GUSSET

BACKGROUND OF THE INVENTION

The invention relates to nuclear power systems, and more particularly to grid structures for nuclear reactor fuel assemblies and the like.

The core of a nuclear reactor typically includes a plurality of fuel assemblies arranged in close spaced relationship in an array the periphery of which approximates a cylinder. These fuel assemblies for a nuclear reactor typically include a plurality of elongated fuel rods held in spaced relationship in an array by a plurality of spacer grids.

To load or unload a fuel assembly into or from the reactor core, it is necessary to move the fuel assembly with respect to fuel assemblies adjacent thereto. This relative movement of adjacent fuel assemblies has resulted in the problem of hangup between the spacer grids of the adjacent assemblies. This hangup can occur between the sides of spacer grids of laterally adjacent fuel assemblies or between the corners of spacer grids of diagonally adjacent fuel assemblies. This hangup can result in irreparable damage to spacer grids, fuel rods, and may leave torn away pieces in the core which must be retrieved.

Many attempts have been made in the prior art to solve the problem of handling interaction and strength of fuel assembly spacer grids. The prior art solution to the problem of hangup between diagonally adjacent assemblies at the corners of the spacer grids has been to chamfer the upper and lower corners of the exterior grip strip. This configuration is superior to the unchamfered configuration but does not completely eliminate the possibility of diagonal hangup.

SUMMARY OF THE INVENTION

The present invention overcomes the problem of diagonal hangup by providing an inclined surface gusset at the upper and lower corners of the outer grid strip. In one embodiment this surface is provided by shaping the upper and lower corners of the exterior grip strips. The corner gusset prevents corner hangup and also strengthens the corner.

An object of the present invention is an improved nuclear fuel assembly spacer grid.

A further object of the invention is a spacer grid wherein corner lead in and stand off are sufficient to avoid hangup between fuel assemblies having like spacer grid designs.

Another object of the invention is a spacer grid yielding the foregoing advantages and in which the corner-to-corner hangup potential is minimized for fuel assemblies employing unlike spacer grid designs.

Yet another object of the invention is a spacer grid which yields the foregoing advantages and which employs an inclined corner gusset to strengthen the grid whereby should interaction occur the likelihood of grid damage is reduced.

Other objects and advantages of the present invention will be readily apparent from the following description and drawings which illustrate a preferred embodiment of the present invention.

BRIEF DESCRIPTION OF THE DRAWINGS

FIG. 1 is a plan view showing a portion of an array of nuclear fuel assemblies.

FIG. 2 is a partial elevation view showing diagonally adjacent fuel assemblies having spacer grids of the prior art.

FIG. 3 is a partial elevation view showing another spacer grid of the prior art.

FIG. 4 is a partial elevation view showing yet another spacer grid of the prior art.

FIG. 5 is a partial perspective view showing a spacer grid according to the preferred embodiment of the present invention.

DESCRIPTION OF THE PREFERRED EMBODIMENT

Figure 7:
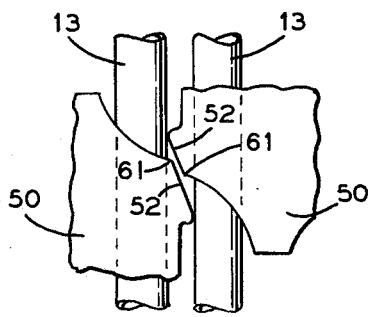
FIG. 7 is a partial elevation view showing diagonally adjacent fuel assemblies having spacer grids according to the preferred embodiment of the present invention.

Refer to FIG. 1 wherein the plan view of a core of fuel assemblies 11 is illustrated. The spacer grids of the diagonally adjacent fuel assemblies 10 to 12 may hung up at the corner indicated by arrow 2 upon their relative movement.

Turn now to FIG. 2 which shows an elevation view of diagonally adjacent fuel assemblies 10 and 12 viewed in the direction of arrow 2 of FIG. 1. Spacer grids 20 and 22 of the prior art hold fuel rods 13 in an array in spaced parallel relationship. Relative motion of the assemblies 10 and 12 are represented by arrows 21 and 23 respectively.

No lead-in chamfer is provided in FIG. 2, and should diagonally adjacent fuel assemblies 10 and 12 contact while assemblies 10 and 12 are being inserted or withdrawn from core 11, hangup damage to grids 20 and 22 is extremely likely.

FIG. 3 shows one arrangement of the prior art wherein chamfers 32 are provided in the corners of spacer grid 30. The corner represented in FIG. 3 possesses a shallow lead-in chamfer which reduces the potential for hangup, but there is still the probability of corner damage should diagonally adjacent fuel assemblies contact. The chamfer angle for keyable spacer grids is limited by the constraints imposed by the keying window and soft stop dimensional requirements. As such, the lead-in angle is too shallow to develop effective lateral forces to separate the fuel assemblies when contact occurs, and grid damage may result.

FIG. 4 depicts a corner configuration which overcomes the disadvantage of the shallow chamfer angle by providing a short steep chamfer on the tips of the corners 42 of grid 40. This configuration has not been used because of the likelihood that the unsupported top points 44 of the chamfer would snag on adjacent grids and thereby cause an even more severe grid damage problem. Accordingly, chamfers 42 and 32 of FIGS. 3 and 4 do not solve the hangup problem between spacer grids of diagonally adjacent fuel assemblies.

Turn now to FIG. 5 wherein a preferred embodiment of the invention is shown. Spacer grid 50 includes a plurality of interlacing interior grid strips 55. Exterior grid strips 56 and 54 as well as interior grid strips 55 are provided with stops 58 for supporting fuel rods in the cells formed by strips 54, 55 and 56 in a known manner. Grid 50 is a keyable type and thus key windows 62 are provided. A number of slight bends 60 in exterior strips 54 and 56 define the longitudinal limits of windows 62.

The prior method of joining exterior grid strips at a 90 degree angle has been improved by the formation of an angled joint, gusset 52, which slopes across the corner of the spacer grid 50 formed by the joining of exterior strips 54 and 56 at seam 61. The design according to the present invention in addition to having a steep gusset angle α (FIG. 8) has a relatively steep edge 57 the combination of which effectively separates the interacting diagonally adjacent fuel assemblies and thereby precludes hangup.

The angle α of the corner gusset 52 is such that when two diagonally adjacent assemblies each having like grids 50 interact as in FIG. 7 corner hangup is extremely unlikely. The present invention is also designed to provide resistance to corner hangup with assemblies of the prior art design.

Figure 8:
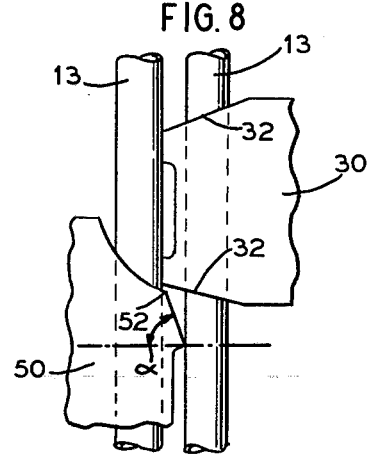
FIG. 8 is a partial elevation view showing diagonally adjacent fuel assemblies one having a spacer grid according to the preferred embodiment of the present invention.

FIG. 8 demonstrates the corner interaction of unlike assemblies, one employing grid 50 of FIG. 5 and the other employing the prior art grid 30 like that shown in FIG. 3. The likelihood of hangup is reduced in these circumstances but should it occur, corner gusset 52 strengthens the corner of grid 50 and significantly reduces the likelihood of corner damage thereto.

Figure 6:
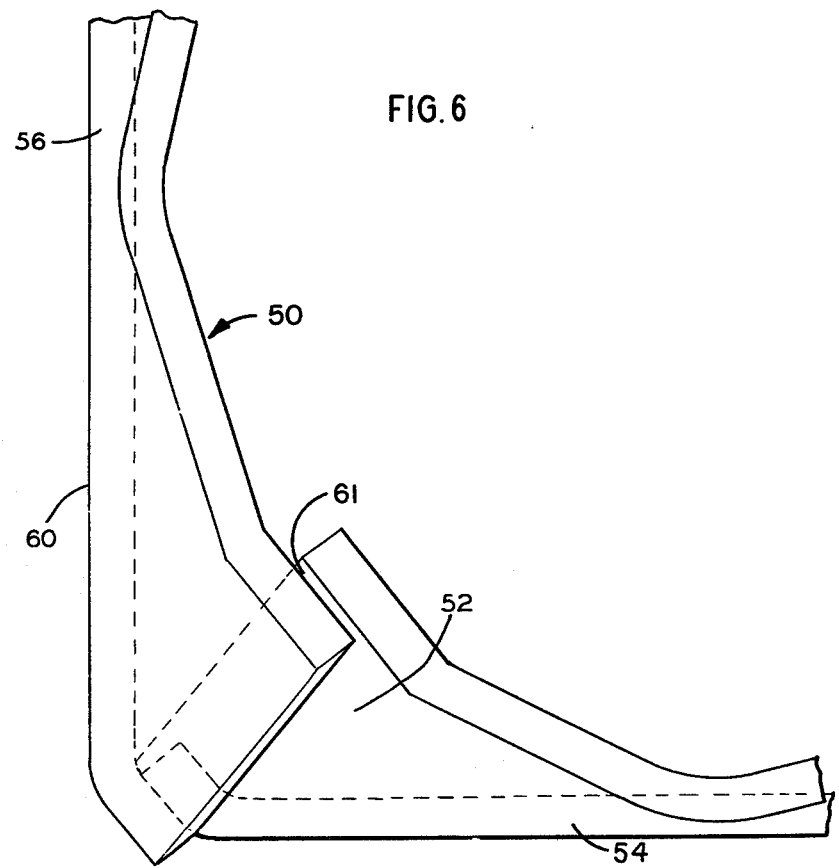
FIG. 6 is a partial plan view of the spacer grid of FIG. 5.

FIG. 6 shows a plan view of the corner of grid 50 of FIG. 5 according to the present invention. In this view it can be seen that plane 52 is formed by contoured grid strips 56 and 54 which overlap at seam 61. Seam 61 is typically effective by welding.

Spacer grid 50 of FIG. 5 is of the keyable type. Grid 50 was used for illustrative purposes only and the invention of providing the corner gusset to both strengthen the grid and minimize corner-to-corner hangup may be employed in any type of spacer grid design.

The above-description and drawings are only illustrative of one embodiment which achieves the objects, features and advantages of the present invention, and it is not intended that the present invention be limited thereto. Any modification of the present invention which comes within the spirit and scope of the following claims is considered part of the present invention.

I claim:

1. A spacer grid for a bundle of longitudinally extending rods in spaced generally parallel relationship comprising;
   spacing means for holding the rods in spaced generally parallel relationship, said spacing means including at least one exterior grid strip circumscribing the bundle of rods along the periphery thereof;
   said at least one exterior grid having a first end defining the boundary of said strip in one longitudinal direction and a second end defining the boundary of said strip in the other longitudinal direction,
   said at least one exterior grid strip having at least one bend formed therein parallel to the longitudinal direction, and
   a plurality of sloped corner gussets formed by said at least one bend and said first end and said second end.

2. A spacer grid as in claim 1 wherein:
   the bundle of rods is generally rectangular in cross-section and there are four of said at least one exterior grid strip each having two ends and each positioned on a corresponding side of the bundle and joined at the ends thereof to two of the other strips at respective rectangle corners.

3. A spacer grid as in claim 2 wherein each of said corner gussets is formed from an adjacent pair of a plurality of strip corners defined by the intersection of the ends of said strips and the edges of said strips said strip corners adjoining said strips and being angled and affixed together to form said truncating surfaces.

4. A spacer grid as in claim 3 wherein said spacing means ia keyable and a plurality of key windows are provided in said exterior strips and some of said key windows occur at the rectangle corners and said exterior strips are adjoined to each other only by said truncating surfaces.

5. A spacer grid for a bundle of longitudinal extending rods in generally parallel relationship, comprising;
   spacing means for holding the rods in generally parallel relationship,
   said spacing means including at least one exterior grid strip circumscribing the bundle of rods along the periphery thereof,
   said grid strip having a first end defining the boundary of said strip in one longitudinal direction and a second end defining the boundary of said strip in the other longitudinal direction, and
   a plurality of sloped corner gussets angled across each of a plurality of corners formed by said first and said second ends.

* * * * *

UNITED STATES PATENT AND TRADEMARK OFFICE
CERTIFICATE OF CORRECTION

PATENT NO. : 4,388,269
DATED : June 14, 1983
INVENTOR(S) : Jeffrey G. Larson

It is certified that error appears in the above-identified patent and that said Letters Patent are hereby corrected as shown below:

Column 1, line 34 -- "grip" should be "grid"

Column 1, line 43 -- "grip" should be "grid"

Column 2, line 25 -- "hung" should be "hang"

Column 4, line 5 -- after "grid" insert "strip"

Column 4, line 28 -- "ia" should be "is"

Signed and Sealed this

Sixth Day of September 1983

[SEAL]

Attest:

GERALD J. MOSSINGHOFF

Attesting Officer   Commissioner of Patents and Trademarks